Patented May 22, 1934

1,959,408

UNITED STATES PATENT OFFICE 1,959,408

COATING COMPOSITION

William S. Calcott, Pennsgrove, N. J., Albert S. Carter, Wilmington, Del., and Frederick B. Downing, Carneys Point, N. J., assignors to E. I. du Pont de Nemours & Company, Wilmington, Del., a corporation of Delaware No Drawing. Application July 10, 1930, Serial No. 467,124

17 Claims. (Cl. 134—26)

This invention relates to coating compositions and more particularly to coating compositions prepared from the polymerization products obtained from partially hydrogenated, unsaturated, polymers of acetylene.

Since the materials from which the coating compositions are prepared are themselves new compounds, the method of their preparation will first be disclosed. These materials, however, are not a part of the present invention but are fully disclosed and claimed in a copending application of applicants Serial No. 446,790, filed April 23, 1930.

It has been shown in previous applications for patent that by passing acetylene into a mixture of ammonium chloride, water, cuprous chloride and copper powder of suitable proportions and under proper conditions, unsaturated hydrocarbons of higher molecular weight are formed. These hydrocarbons may be separated by distillation from the reaction mixture. The product is a low-boiling (80–85° C.) highly unsaturated liquid. This liquid is apparently made up of a number of constituents, apparently having the general formula $C_xH_x$. The major constituent is called divinylacetylene and most probably has the empirical formula $C_6H_6$. Others formed in appreciable proportions, which may be mentioned, are believed to have the formulæ $C_8H_8$ and $C_4H_4$. These products in turn may be roughly separated by distillation.

The example following illustrates the preparation from acetylene of the above described compounds:

Example A 945 parts by weight of ammonium chloride, 1000 parts by weight of water, 2850 parts by weight of cuprous chloride, and 100 parts by weight of copper powder, are mixed and this mixture thoroughly agitated while passing into it acetylene gas. When the reaction slows up, as shown by a decrease in the rate of absorption of acetylene, the operation is discontinued, and the highly unsaturated hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass. As already stated, the resultant material contains a number of polymers the most abundant of which is believed to be divinylacetylene and to have the formula

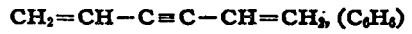
$$CH_2=CH-C\equiv C-CH=CH_2, (C_6H_6)$$

Other polymers produced in appreciable quantities are believed to have the formulæ: $C_8H_8$ and $C_4H_4$. These products may be roughly separated by distillation.

It has also been shown that the crude mixture, any one of its constituents or mixtures of the various constituents may be polymerized in various ways, for instance, by aging at ordinary temperatures. The polymerization is greatly accelerated at elevated temperatures, and is known to take place either in the presence of oxygen or inert gases, as nitrogen. In the presence of oxygen, the polymerizing material will absorb oxygen with the development of compounds having explosive properties.

Therefore, if it is desired to carry out the polymerization in an oxygen environment and at the same time produce a material free from chemically combined oxygen some method for inhibiting oxidation must be employed. One successful method already disclosed is to incorporate into the material to be polymerized a substance which will prevent oxygen absorption.

As the polymerization proceeds regardless of the method employed, the material passes successively to an oily, then to a gelatinous, then to a resinous mass, and finally yields a hard, brittle resinous material having unusual resistance to the action of water and to organic solvents. The oily product which is first formed is largely soluble in alcohol and acetone; the gelatinous body next formed is largely soluble in acetone but only partially soluble in alcohol; the resinous modification is substantially insoluble in alcohol and is to a slight extent soluble in acetone; the final, hard, brittle polymers are substantially insoluble in both alcohol and acetone. These successive polymerization products apparently consist of a group of compounds in various stages of polymerization and they may be only roughly separated by dissolving. They may be successfully separated by distillation.

If the polymerization is stopped in the initial stages, the oily liquid polymer obtained may be separated from the volatile unpolymerized material by distillation. The resultant residue is a non-volatile substance having the general properties of a bodied drying oil. It has been shown that this drying oil may be used in the manufacture of paints or other coating compositions. It may be mixed with the solvents, pigments, fillers, etc., commonly employed in the preparation of coating compositions.

As illustrative of the partial polymerization by a known method of the material obtained in Example A, the following example is furnished.

Example B 1000 grams of pure divinylacetylene obtained from the product of Example A by distillation are boiled at atmospheric pressure and in the presence of air for four hours in a vessel provided with a condenser for the return of the condensed vapors to the reaction. The temperature of the boiling liquid is between 89° and 90° C. At the end of four hours the unchanged divinylacetylene is distilled off under reduced pressure. There remains, in 12 to 18% yield, a viscous non-volatile residue having the general properties of a bodied drying oil and consisting of the polymerized divinylacetylene.

Owing to their high degree of unsaturation, the characteristic behavior of the polymerizable acetylene polymers, as prepared by the methods described above, is to rapidly absorb oxygen and also to undergo further polymerization.

It has been found that, by hydrogenating the unsaturated acetylene polymers described above (preferably in the presence of a catalyst), compounds are produced which show a decreased tendency to polymerize and absorb oxygen chlorine and bromine. All of the acetylene polymers described above, whether or not they are partially polymerized, as has been shown in the copending application hereinafter identified, will react with hydrogen under suitable conditions, with the possible exception of the substantially completely polymerized hard brittle solid polymer. The less highly polymerized solid polymers of the semiplastic type, however, react normally.

As illustrative of the hydrogenation by a known method of the described acetylene polymers, the following example is furnished.

Example C 100 parts of the acetylene polymer thought to be divinylacetylene are dissolved in an equal volume of acetone and 5 parts of a reduced nickel catalyst supported on kieselguhr and containing about 40% nickel are added. This catalyst may be prepared by precipitating nickel hydroxide on kieselguhr and igniting in an atmosphere of hydrogen by well known methods. The mixture is placed under 2 to 10 atmospheres of hydrogen pressure and heated to 70°–100° C. with violent agitation. When 2.5 parts of hydrogen have been absorbed, the product is removed. It absorbs oxygen more slowly and is less unsaturated with respect to bromine absorption than the starting material. The product obtained by this partial hydrogenation contains practically no hexane or hexene but contains hexatriene (boiling 75°–80° C.), probably in admixture with hexadienes, ethylvinylacetylene and diethylacetylene together with some unreduced acetylene polymers. This mixture may be separated by known methods of fractionation or may be used directly. It and some of its constituent hydrocarbon members have been found to possess valuable application as resin forming materials, intermediates for the preparation of alcohols, glycols, halogen compounds and their derivatives.

The products of this hydrogenation are a mixture of saturated and unsaturated hydrocarbons, the average molecular weight of which is dependent upon the particular acetylene polymers started with and the percentage composition is dependent upon the catalyst, the temperature and pressure, and the quantity of hydrogen added. Thus, if one starts with the acetylene polymer thought to be divinylacetylene, $C_6H_6$, the reduced products will contain some or all of the following, hexane, hexene, hexadiene, hexatriene, ethylvinylacetylene and diethylacetylene; if the starting material to be the tetramer of acetylene, $C_8H_8$, the products will contain octane and a series of unsaturated hydrocarbons of eight carbon atoms. In each of these cases, however, the relative quantities of the constituent products is determined by the catalyst, temperature, pressure, and quantity of hydrogen absorbed.

It will be understood that any one of the unsaturated acetylene polymers described hereinabove or a mixture thereof may be hydrogenated similarly to the divinylacetylene of Example C and that the hydrogenation, instead of being discontinued at an intermediate stage as described in Example C, may be continued to any successive stage until an amount of hydrogen equivalent to 10% of the weight of the original polymer has been absorbed. Other suitable catalysts may be employed.

The preparation of the hydrogenated compounds adapted for use in the compositions of this invention is disclosed in detail in the Calcott, Carter and Downing application filed March 24, 1930, Serial No. 438,658.

Polymers of acetylene in a highly polymerized state have been utilized to advantage to replace drying oils and resins in the manufacture of coating compositions (application No. 384,239, filed August 7, 1929). These polymers have been found to supply new and improved compositions which are resistant to the action of water, organic solvents, strong acids and alkalies. These compositions, however, are unsatisfactory for many purposes owing to the fact that they suffer changes of color upon standing and exposure to sunlight, and, owing to excessive hardness and brittleness combined with only fair adhesion, under many conditions coatings composed of these acetylene polymers crack and peel.

Object of invention

It is therefore the object of the present invention to produce a coating composition adapted to yield, when dried, films which combine with the unusual resistance to the action of water, organic solvents, acids and alkalies, characteristic of the film formerly obtained from polymers of acetylene, superior flexibility, toughness, light stability and adhesion.

With these objects in mind, it has been discovered that, if the products obtained by hydrogenating as in Example C, the polymerizable acetylene polymers of the type described in Examples A and B above are subsequently polymerized or if the polymerized products of the type described in Example B are merely hydrogenated, the resulting products when employed as coating compositions form films which combine to a remarkable degree the desired properties.

Any of the hydrogenated unsaturated polymerization products of the type illustrated and described in connection with Example C above and in application Serial No. 438,658, when partially polymerized to film-forming products are adapted for such use. These hydrogenated polymerized products, when further polymerized, as illustrated in the following examples, dry rapidly with practically no loss in weight, the drying being controllable by the addition of antioxidants such as eugenol and guaiacol and driers such as soluble compounds of lead, cobalt and manganese. Pigments, coloring materials, volatile solvents, and fillers may also be incorporated into these coating compositions in desirable proportions depending upon the intended use. These compositions may be applied by brush, spray, dip, flow or any other method used in the art; and the articles thus finished may be dried at ordinary temperature or by accelerated means such as baking.

In order to illustrate the invention the following examples are furnished. It will be understood that the conditions specifically recited therein may be varied within wide limits and that such variations while they may result in different results are nevertheless within the scope of the invention provided polymerization is effected.

Example 1

Reduced acetylene polymers obtained by adding 2 parts of hydrogen to 78 parts of crude acetylene polymers, (obtained according to Example A, prior art), in the presence of nickel at 85° C. and 150 pounds of hydrogen pressure, is heated to boiling in an atmosphere of nitrogen and maintained at that temperature for five hours, returning the condensed vapor to the reaction by means of an efficient reflux condenser. The product obtained at the end of this period is distilled at about 70° C. and 10 mm. pressure. One part of the viscous non-volatile oil remaining is mixed with 2 parts of solvent naphtha. When employed as a coating composition, the films which result are light in color, flexible and substantially unaffected by light over long periods.

Example 2

The reduced acetylene polymers described in Example 1 are carefully fractionated and the portion boiling between 72° and 76° C. is heated under its own vapor in a closed bomb at 120° to 150° C. for 3 hours. At the end of this time the unpolymerized material is removed by distillation leaving a residue equal to approximately 20% of the original material, which is practically colorless, very stable toward either visible or ultraviolet light and which rapidly absorbs halogens or oxygen. When admixed with an equal volume of solvent naphtha and employed as a coating composition films are obtained which are water white and show practically no tendency to become colored. They are flexible and possess good adhesion.

Example 3

5 parts of the polymerized reduced product described in Example 2 is mixed with 5 parts of xylene and 3 parts of finely ground titanium oxide and the mixture ground in a pebble mill. A white enamel of good quality and short drying time is produced.

Example 4

Crude acetylene polymers prepared as illustrated in Example A (prior art) are reduced, as illustrated in Example C (prior art) at 85° C. in an equal volume of acetone with hydrogen at 10 atmospheres pressure in the presence of nickel until hydrogen equal to 2.5% of the original weight has been added. The product is violently boiled under a reflux distilling column which returns all material boiling over 70° to the reaction flask and allows acetone and other low boiling constituents to escape. When distillation ceases, 1% of benzoyl peroxide is added to the residue and heating continued at 70°–90° for two hours. 5 parts of the resulting product are mixed with 2 parts of xylene and 1 part of aluminum powder and the mixture milled in an ordinary paint mill. The resulting aluminum paint is especially suited for painting sheet metal.

Example 5

100 parts of the polymerized acetylene polymers of Example B characterized as the viscous non-volatile oil is dissolved in 2 volumes of sulfur-free benzene containing 1 part of platinum oxide catalyst, prepared by igniting chloroplatinic acid with potassium nitrate in a well known manner, is placed under 3 to 10 atmospheres pressure of hydrogen and violently agitated at a temperature between 25° and 100° C. until the hydrogen absorption has reached 2.5 to 3 parts by weight, giving after removal of the benzene, a product which may be employed directly as a coating composition or admixed with solvents, driers, etc., as desired.

Example 6

Crude reduced acetylene polymers obtained by adding 3 parts of hydrogen to 78 parts of crude acetylene polymers, obtained as described in Example A, are slowly added to concentrated sulfuric acid at 0° C. Violent reaction results with the evolution of considerable heat which must be removed continuously, at the same time agitating the mixture to obtain contact of the acid and reduced acetylene product. When a quantity of reduced material equal to the weight of the sulfuric acid has been added, agitation is continued for one hour while the product is allowed to slowly warm up to 20°–30° C. to effect polymerization. The product may be worked up in two ways: (1) separation may be allowed to take place and the polymer removed by filtration, or (2) water may be added followed by separation into two layers with subsequent evaporation of volatile material from the black polymer layer. In either case, a black, tarry polymer is obtained which is somewhat thermoplastic and slowly becomes hard and brittle upon continued heating or exposure to air. In addition to the polymer, a portion of the material reacts with the sulfuric acid forming sulfur containing esters which are in part converted into alcohols and glycols by treatment with water. Hexenyl alcohol has been isolated from this alcohol mixture. This polymer may be employed directly as a coating composition or admixed with solvents, driers, etc., as desired.

Example 7

100 parts of the polymerized product used in Example 1 is mixed with an equal weight of xylene and 10 parts of chinawood oil, giving a coating composition of greater flexibility than those described in Example 1.

Example 8

Acetylene polymers are reduced as in Example C (prior art) until 2.2 parts of hydrogen have been absorbed and are then fractionated carefully collecting that material boiling between 72° and 76° C. To this is added an equal weight of styrene and the mixture polymerized in the presence of benzoyl peroxide for 3 hours at 110° under an atmosphere of nitrogen in a closed autoclave. The product thus obtained is distilled under diminished pressure to a thick syrup. When this material is employed directly as a coating composition, films of remarkable flexibility and adhesion are obtained. If desired, it may of course be employed together with a solvent, pigments, etc.

Example 9

The polymer used and described in Example 2 (above) is mixed with an equal weight of solvent naphtha, 2.25 parts (by weight) of powdered silica and 0.75 part of ground asbestine. This composition is milled in a ball mill for 20 hours and at the end of that period is used directly as a corrosion resistant white paint of unusual durability, suitable for coating sheet metal or unglazed porcelain.

Example 10

The non-volatile product obtained from a carefully selected fraction of polymerized reduced divinylacetylene as described in Example 2 is mixed with two volumes of solvent naphtha or other suitable solvent and 1 to 2% of eugenol. This composition constitutes an excellent top-coat or lacquer finishing coat for application over a paint coat such as that described in Example 9. The addition of eugenol retards drying and gives rise to an improvement in appearance by decreasing the wrinkling tendencies of the film-forming material.

This example illustrates the use of an antioxidant for slow drying. Antioxidants are not generally employed in the coating compositions where films are employed but are of particular value for use in clear lacquers and top-coats.

Example 11

Reduced acetylene polymers described in Example 1, are polymerized for 3 hours under an atmosphere of nitrogen in an autoclave at 100° C. At the end of this period, one volume of toluene, xylene, solvent naphtha, or other suitable solvent is added for each four volumes of reduced acetylene polymer originally present, and polymerization is continued for several hours at 100° to 110°, at which time the product is distilled free of unpolymerized material and part or all of the solvent, leaving a solution of light colored, film-forming polymerized reduced acetylene polymer dissolved in the remaining solvent. This solution is suitable for use as a lacquer as such, or it may be compounded into a pigmented coating composition with rapid drying characteristics and high resistance to corrosion by the addition of a suitable filler and pigment.

From the above examples it will be clear that any of the partially polymerized reduced acetylene polymers of the type described in the copending application of the same inventors are adapted for use in coating compositions. We prefer, however, to employ those products which have been polymerized to a degree equivalent to the polymerization resulting from heating to between 120°–150° C. for about 3 hours.

All of the reduced acetylene polymers do not polymerize in exactly the same manner but the basic reaction of polymerization is common to all of those which are still unsaturated. Even those members which are hydrogenated to a degree of saturation as high as hexene undergo partial polymerization under extreme conditions.

It will be understood that the products resulting from polymerizing the hydrogenated products are mixtures of complex constitution and that it is impossible to state what is their exact chemical constitution. Although many of the supposed constituents are recorded in the literature, many also were heretofore unknown. The specific composition of these mixtures depends, of course, upon the particular raw materials and method employed in a given instance but whatever the method employed, the resulting mixtures possess in common valuable properties distinguishing them from known hydrocarbons or known mixtures of hydrocarbons.

Prior to polymerization the acetylene polymers may be reduced to any desired degree of saturation less than that represented by the formula $C_nH_{2n+2}$.

We prefer however to use for polymerization those compounds with which from 2.2% to 2.6% parts of hydrogen have been combined prior to polymerization as illustrated in Example C and in particular, the fraction of the so reduced polymer which distills between 70° and 80° C. and contains hexatriene 1, 3, 5. These preferred products are derived from a hydrocarbon mixture which itself has not been heretofore prepared. In the preparation of these reduced products, we prefer to employ the crude unpolymerized acetylene polymers described in Example A.

Mixtures of the partially polymerized reduced products with other polymerizable materials may of course be used in the preparation of the coating compositions contemplated. Thus, polymerized reduced acetylene polymers may be used in mixture with polymerized unreduced acetylene polymers; or reduction of the original acetylene polymer may be carried to a point where both reduced and unreduced acetylene polymers are present and the mixture polymerized together as a single substance; or reduced acetylene polymers may be polymerized with or added to other polymerizable or unpolymerizable materials suitable as film materials, for example, butadiene, dimethylbutadiene, isoprene, styrene, Chinawood oil, furylethylene, matter composed of phthalic anhydride and glycerol with and without added oils, phenol-formaldehyde condensation products and all other products commonly employed in coating compositions such as mentioned in the copending case of Collins referred to above.

In order that the new synthetic drying oils may be used to form from the most desirable coating compositions, we may control their flexibility, viscosity, and drying characteristics either during or after polymerization. Thus, the flexibility may be increased by the addition of rubber softeners, such as oleic acid. The viscosity may be increased by the addition of synthetic resins, like meta styrene, or other viscous, film-forming material which is compatible with the synthetic drying oils, or it may be decreased as desired by dilution with an appropriate quantity of solvents, such as xylene, acetone or butyl acetate, in the usual manner, or by the addition of small amounts of amines. Sufficient solvent should be used to give a convenient fluidity for application; in our tests, this has varied from 0 to 90%. As shown in Example 11, the solvent, if desired, may be incorporated with the acetylene derivative at some stage prior to the final polymerization step.

These synthetic drying oils dry and harden in thin films, without substantial loss of weight (not over 1%), on exposure to air at ordinary or elevated temperatures. The rate at which the films dry may be increased by the addition of driers, such as soluble compounds of lead, cobalt, and manganese. Because of the rapid absorption of oxygen by these synthetic drying oils, it has been found advantageous in some cases to add a small amount of an antioxidant, e. g., eugenol, in order to reduce the tendency to skin and solidify in the container. Other compounds of the well known class of antioxidants may be employed in place of eugenol. The amount of antioxidant used is controlled so that it does not alter the thin film drying rate to an objectionable degree for practical purposes. The properties of the films may be altered further by the admixture of natural drying oils, natural gums, synthetic resins, and the like. Pigments and other coloring materials may also be incorporated by the usual methods and in the usual proportions shown in standard works on coating compositions. The quantity of pigment and filler will be varied, dependent upon the method of application as well as upon the physical nature of the filler and the intended use; thus, formulæ requiring from 0 to 65% of filler have been used.

Since the proportions may be varied within wide limits depending upon the intended use, the invention in its broader aspects is not limited to any particular proportions of added materials so long as the new drying oils are present in substantial amounts.

From the foregoing description and examples, it is apparent that we have discovered a new type of coating composition suitable for film formation and having as its base compounds which are derived from acetylene polymers by further polymerization and subsequent reduction. The resulting films are similar to those obtained from polymerized acetylene polymers and superior to natural drying oils with respect to their hardness, drying time and resistance to water, solvents and corrosive substances, but superior to films obtained from acetylene polymers in that they are more flexible, more adhesive to most surfaces and more stable with regard to change of color.

As many apparent and widely different embodiments of this invention may be made without departing from the spirit thereof, it is to be understood that we do not limit ourselves to the foregoing examples or description except as indicated in the following claims.

We claim:

1. A partially polymerized hydrogenated polymerizable acetylene polymer in admixture with a paint or varnish adjunct of the group consisting of driers, pigments, fillers, antioxidants, volatile solvents, softeners, natural gums and drying oils, and synthetic resins.

2. In admixture with a paint or varnish adjunct of the group consisting of driers, pigments, fillers, antioxidants, volatile solvents, softeners, natural gums and drying oils, and synthetic resins, a product obtained by heating to between 25° to 200° C. a hydrogenated polymerizable acetylene polymer to effect partial polymerization.

3. In admixture with a paint or varnish adjunct of the group consisting of driers, pigments, fillers, antioxidants, volatile solvents, softeners, natural gums and drying oils, and synthetic resins, a product obtained by hydrogenating a polymerizable polymer of acetylene until up to 10% of hydrogen based on the original weight of the acetylene polymer has been absorbed and thereafter removing the unpolymerized material by distillation.

4. In admixture with a paint or varnish adjunct of the group consisting of driers, pigments, fillers, antioxidants, volatile solvents, softeners, natural gums and drying oils, and synthetic resins, the product obtained by hydrogenating an acetylene polymer containing divinylacetylene.

5. In admixture with a paint or varnish adjunct of the group consisting of driers, pigments, fillers, antioxidants, volatile solvents, softeners, natural gums and drying oils, and synthetic resins, the product obtained by combining from 2.2 to 2.6 parts of hydrogen with 100 parts of an acetylene polymer containing divinylacetylene and heating the reduced product to a temperature between 120° and 150° C. to effect polymerization.

6. In admixture with a paint or varnish adjunct of the group consisting of driers, pigments, fillers, antioxidants, volatile solvents, softeners, natural gums and drying oils, and synthetic resins, the product obtained by hydrogenating an acetylene polymer containing divinylacetylene, separating that portion of the hydrogenated product boiling above 70° C., heating the separated product in its own vapor to a temperature between 120° to 150° C. for about 3 hours to effect polymerization and removing the unpolymerized material by distillation.

7. In admixture with a paint or varnish adjunct of the group consisting of driers, pigments, fillers, antioxidants, volatile solvents, softeners, natural gums and drying oils, and synthetic resins, the product obtained by hydrogenating an acetylene polymer containing divinylacetylene, separating that portion of the hydrogenated product boiling between 72° and 76° C. and then polymerizing that portion.

8. In admixture with a paint or varnish adjunct of the group consisting of driers, pigments, fillers, antioxidants, volatile solvents, softeners, natural gums and drying oils, and synthetic resins, the product obtained by hydrogenating a polymerizable acetylene polymer, adding a polymerizable unsaturated hydrocarbon, and heating the resulting mixture to effect polymerization.

9. In admixture with a paint or varnish adjunct of the group consisting of driers, pigments, fillers, antioxidants, volatile solvents, softeners, natural gums and drying oils, and synthetic resins, the product obtained by combining 2 parts of hydrogen with substantially 78 parts of an acetylene polymer containing divinylacetylene, separating that portion of the hydrogenated product boiling between 72° and 76° C., adding an equal volume of divinylacetylene and heating the mixture in its own vapor to a temperature between 120° to 150° C. for about 3 hours to effect polymerization.

10. The composition set forth in claim 1 which contains in addition to the acetylene derivative other compatible polymerizable film-forming material.

11. A composition of the type set forth in claim 1 which contains a volatile solvent, powdered silica and ground asbestine.

12. A composition of the type set forth in claim 1 which contains a drying oil of the class consisting of linseed oil and Chinawood oil.

13. A coating composition of the type set forth in claim 1 which contains from 1 to 2 parts of an inert volatile solvent to each part of partially polymerized hydrogenated polymerizable acetylene polymer.

14. A coating composition of the type set forth in claim 6 containing substantially 5 parts of the polymer of the hydrogenated acetylene polymer boiling above 70° and 2 parts of an inert volatile solvent.

15. As a new product, the material resulting from exposing to oxygen a film containing a partially polymerized hydrogenated polymerizable acetylene polymer.

16. As a new composition of matter, the product resulting from exposing to oxidation a film comprising partially polymerized hydrogenated divinylacetylene.

17. A product resulting from exposing to oxidation a film comprising a partially polymerized hydrogenated acetylene polymer boiling between 72° and 76° C.

WILLIAM S. CALCOTT.
ALBERT S. CARTER.
FREDERICK B. DOWNING.